United States Patent [19]

Richardson

[11] Patent Number: 5,625,362
[45] Date of Patent: Apr. 29, 1997

[54] RADAR EQUIPMENT AND METHOD FOR ITS OPERATION

[75] Inventor: Michael R. Richardson, Romsey, Great Britain

[73] Assignee: Siemens Aktiengesellschaft, Munich, Germany

[21] Appl. No.: 643,640

[22] Filed: May 6, 1996

Related U.S. Application Data

[63] Continuation of PCT/EP94/03646, Nov. 7, 1994

[30] Foreign Application Priority Data

Nov. 6, 1993 [GB] United Kingdom ............... 9322924

[51] Int. Cl.$^6$ ................................. G01S 13/93; G01S 13/06
[52] U.S. Cl. ................................. 342/70; 342/109; 342/115; 342/196
[58] Field of Search ............................ 342/70, 71, 72, 342/109, 115, 192, 196

[56] References Cited

U.S. PATENT DOCUMENTS

| | | | |
|---|---|---|---|
| 4,429,309 | 1/1984 | Kipp | 342/103 |
| 4,568,938 | 2/1986 | Ubriaco | 342/87 |
| 4,825,214 | 4/1989 | Dejaegher | 342/128 |
| 5,072,223 | 12/1991 | Hethuin et al. | 342/122 |
| 5,247,306 | 9/1993 | Hardange et al. | 342/70 |
| 5,268,692 | 12/1993 | Grosch et al. | 342/70 |
| 5,369,409 | 11/1994 | Urabe et al. | 342/133 |
| 5,517,196 | 5/1996 | Pakett et al. | 342/70 |

FOREIGN PATENT DOCUMENTS

| | | |
|---|---|---|
| 4040572 | 6/1992 | Germany. |
| 2172461 | 9/1986 | United Kingdom. |

*Primary Examiner*—John B. Sotomayor
*Attorney, Agent, or Firm*—Herbert L. Lerner; Laurence A. Greenberg

[57] ABSTRACT

A cost-effective FMCW radar equipment has a digital signal processor which controls at least one antenna through an oscillator and produces a mixed signal from transmitted and received signals modulated with a triangular waveform. The mixed signal is subjected to Fast Fourier transformation for each modulation phase (up and down) of each measurement cycle in order to obtain object frequencies, which are assigned to each target object, from the determined maxima. Object tracks which are formed from the object frequencies extend back over a plurality of measurement cycles and are used to form estimated values for those measured values of the object frequencies which are to be expected in the next measurement cycle. The mutually associated object frequencies of both modulation phases of a measurement cycle are determined and the distance and relative speed of each target object are determined from them.

13 Claims, 2 Drawing Sheets

1

RADAR EQUIPMENT AND METHOD FOR ITS OPERATION

CROSS-REFERENCE TO RELATED APPLICATION

This application is a Continuation of International Application Serial No. PCT/EP94/03646, filed Nov. 7, 1994.

BACKGROUND OF THE INVENTION

Field of the Invention

The present invention relates to a radar equipment having at least one antenna for transmission and reception of radar signals, a signal generator for supplying the antenna, and a mixer and a filter for producing a mixed signal, the signal processor receiving the mixed signal and further sensor signals, recording the frequencies of maxima in the spectrum of the mixed signal separately on the basis of a rising and a falling modulation phase as object frequencies, and calculating the distance and the relative speed of a target object from the object frequencies.

The present invention also relates to a method for operating a radar equipment which has at least one antenna for transmission and reception, a signal processor which supplies the antenna, and a mixer and a filter which produce a mixed signal and feed the mixed signal to the signal processor, wherein those digital samples of the mixed signals which are detected and recorded in each modulation cycle during the two modulation phases are subjected separately to Fast Fourier transformation in successive measurement cycles which include a rising and a falling modulation phase in the digital signal processor and a subsequent evaluation pause in order to determine the object frequencies from the maxima contained in the spectra.

The invention is used in particular for collision warning and control of the movement of vehicles.

The frequency band which is allocated for radar operation is around 77 GHz. The predetermined (technical and legal) boundary conditions for the transmitter result in the use of a frequency modulated continuously transmitted carrier wave (FMCW radar) as the only cost-effective possibility.

In the case of that modulation, the transmission frequency is normally varied within a narrow frequency band of typically 200 MHz, frequency shift, with the aid of a sawtooth or triangular-waveform modulation signal. One modulation cycle thus includes a rising and a falling modulation phase. A receiver mixes the transmitted signal which is modulated in that way with echo signals which are reflected from target objects, and mixes those echo signals to form a mixed signal which, per modulation phase and target object, contains one frequency which is characteristic of that target object and is referred to below as the target object frequency. The distance and relative speed of the target object can then be calculated from the object frequencies in the two modulation phases of a modulation cycle. The frequency which characterizes the distance in that case is proportional to the modulation rate (frequency shift per unit time). In the case of a moving target object, the object frequency is additionally dependent on the Doppler effect and is thus proportional to the speed of the target object and the transmission frequency.

Normally, the modulation rate is selected to be as high as possible in order to permit that component of the object frequency which is caused by the Doppler effect, the relative speed component fv, to be kept as small as possible in comparison with the range component fr within the detection area under consideration.

Those two components result from the object frequencies during the two modulation phases as follows: the object frequency in the first modulation phase with a rising frequency is given by the formula fu=|fv−fr|, and that in the second modulation phase with falling frequency is given by the formula fd=|fv+fr|. Since fr becomes very large in comparison with fv, if the modulation rate is very high, the assignment of the object frequencies belonging to the same target object within the two modulation phases, and thus the calculation of distance and relative speed based thereon, are simple, even if a plurality of target objects are present.

In principle, the mixed signal must be sampled at a rate which is greater than the frequency resulting from the Nyquist theorem in the case of the largest detection area. Thus, systems having a modulation rate which is as high as possible require very fast and thus costly analog to digital converters in conjunction with correspondingly fast processors and memory systems for the buffer storage of the samples for further analysis. Such a system can therefore not be used for a cost-effective radar system, such as for use in a car, for example.

Admittedly, conventional digital modules and processors can be used if the modulation rate is appropriately reduced. However, that would have the consequence, in some cases (fast target objects at short range), of causing the value of fd to become greater than that of fr which results in ambiguities in the assignment of the object frequencies in the two modulation phases as soon as a plurality of target objects are present. In addition, the measurement accuracy and the resolution of the system are adversely affected as a result of the poorer separation between adjacent object frequencies and as a result of the smaller number of samples within a modulation phase.

A further limitation results from the low transmission power, with the consequence that the echo signals are very close to the system noise.

SUMMARY OF THE INVENTION

It is accordingly an object of the invention to provide a radar equipment and a method for its operation, which overcome the hereinafore-mentioned disadvantages of the heretofore-known devices and methods of this general type and which are simple and therefore cost-effective.

In accordance with the invention, the mixed signal formed from the transmitted signal and the received signal is subjected, after digitization, to Fast Fourier transformation (FFT) and those maxima which determine the object frequencies are determined in the frequency spectrum which is thus obtained. After correct assignment of each object frequency in the spectra belonging to the two modulation phases to the associated target object, the distance and the relative speed can then be calculated for each target object from the sum and difference of the object frequencies (frequency pair).

With the foregoing and other objects in view there is provided, in accordance with the invention, a radar equipment, comprising at least one antenna for transmitting and receiving radar signals; a signal processor for supplying the at least one antenna; and a mixer and a filter for producing a mixed signal; the signal processor receiving the mixed signal and further sensor signals, recording frequencies of maxima in a spectrum of the mixed signal separately on the basis of a rising and a falling modulation phase as object frequencies, and calculating a distance and a relative speed of a target object from the object frequencies; the object frequencies of the target object being stored separately over a number of measurement cycles on the basis of the rising and falling modulation phases; object tracks describing a previous time response of the object frequencies being formed from the stored object frequencies; estimated values for the object frequencies to be expected in a next measurement cycle being formed from a previous response of the object tracks; object frequency pairs in each case having the lowest error being assigned to one another, after calculation of an error from the object frequencies and from the estimated values obtained from the object tracks; and correct values for a range and a relative speed of the target object being calculated from the pairs.

With the objects of the invention view there is also provided, in accordance with the invention, a method for operating a radar equipment, which comprises transmitting and receiving with at least one antenna; supplying the at least one antenna from a signal processor; producing a mixed signal and feeding the mixed signal to the signal processor with a mixer and a filter; separately subjecting digital samples of the mixed signals being detected and recorded in each modulation cycle during two modulation phases to Fast Fourier transformation in successive measurement cycles including a rising and a falling modulation phase in the digital signal processor and a subsequent evaluation pause for determining object frequencies from maxima contained in spectra; separately forming object tracks describing a previous time response of the object frequencies having been stored over a number of measurement cycles for a target object, on the basis of rising and falling modulation phases from the object frequencies; forming estimated values for the object frequencies to be expected in the next measurement cycle from a previous response of the object tracks; assigning object frequency pairs having the lowest error in each case to one another, after calculation of an error from the object frequencies and from the estimated values obtained from the object tracks; and calculating correct values for a range and a relative speed of the target object from the pairs.

The invention is based on the consideration that the assignment of the object frequencies which belong to the same target object in the two modulation phases is possible as a function of the shift in these object frequencies in successive measurement cycles. Relatively long modulation cycles result in this case on the basis of the minimum time which is determined by the application for detection of a target object and thus low modulation rates, which make it possible to use simple and cost-effective digital modules.

According to the invention, the object frequencies of the same target object are thus stored in each measurement cycle and are tracked over a number of measurement cycles, for example 3 to 5. A Fourier transformation in this case is carried out to determine these object frequencies, and the power spectrum is calculated.

Other features which are considered as characteristic for the invention are set forth in the appended claims.

Although the invention is illustrated and described herein as embodied in a radar equipment and a method for its operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
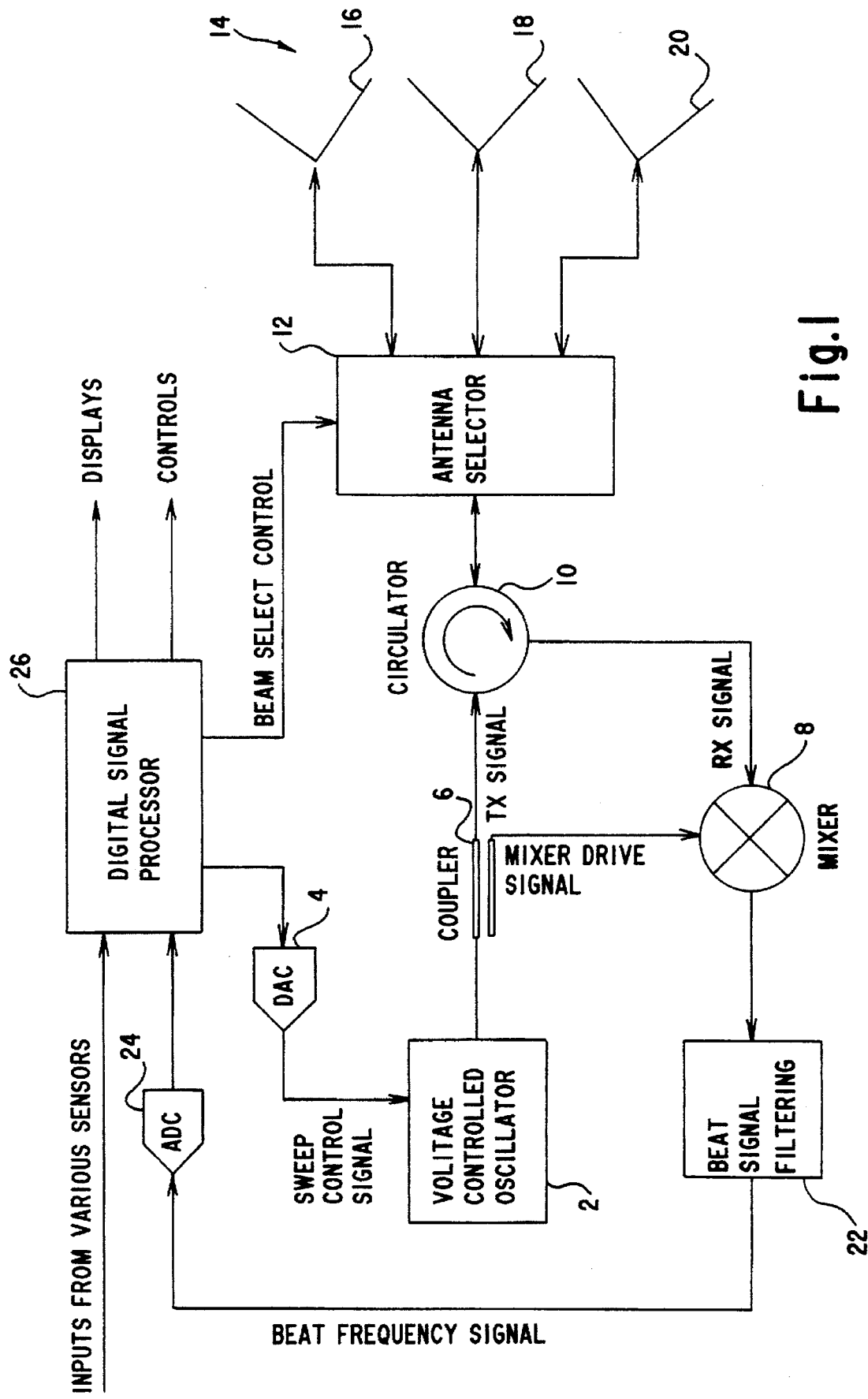
FIG. 1 is a block circuit diagram of an exemplary embodiment of radar equipment according to the invention.

Referring now to the Figs. of the drawings in detail and first, particularly, to FIG. 1 thereof, there is seen radar equipment which operates by using a voltage-controlled oscillator 2 that is connected on the output side through a directional coupler 6 and a circulator 10 to an antenna selector 12 which, for its part, is connected to three radar antennas 16, 18 and 20. A mixer 8 receives echo signals reflected from target objects on one hand and part of a transmitted signal from the directional coupler 6 on the other hand, and supplies a mixed signal, which is fed through an analog filter 22 and an analog to digital converter 24 to a digital signal processor 26. The digital signal processor 26 determines a response of the modulation signal, which controls the oscillator 2 through a digital to analog converter 4. The processor 26 passes a data sequence to the digital to analog converter 4, which is equipped with a low-pass filter. An analog modulation signal is produced from the data sequence.

The processor 26 furthermore controls a selection of the antennas through the selector 12, as well as functions within the vehicle which is fitted with the equipment, such as warning displays, intervention in an engine control and/or braking, for example, in order to influence the vehicle speed. To this end, the processor 26 receives sensor signals from the vehicle, for example relating to the speed and steering angle of one's own vehicle.

The oscillator 2 produces a radar signal at a frequency of around 77 GHz, which is varied by the modulation signal (frequency shift between 100 and 300 MHz). The modulation signal in this case is triangular and exhibits the desired low modulation rate, for example 50 MHz/1 ms.

The mixer 8 multiplies the echo signal coming from the antennas through the selector and the circulator by a part of the transmitted signal which is picked off through the directional coupler 6, and produces a mixed signal which contains object frequencies for each target object. The object frequencies are dependent on the distance and relative speed of the target object. The filter 22 removes undesired radio-frequency and DC components from this mixed signal, and maximizes the signal to noise ratio.

The filter 22 contains a further filter ($R^4$ filter) which is not illustrated, or that filter is inserted downstream of the filter 22 but upstream of the analog to digital converter 24. This is done in order to at least partially compensate for propagation effects, that is losses resulting from beam expansion, which losses increase with a factor $R^4$ of the distance R, and therefore to reduce the dynamic range, in order to reduce the requirements for the downstream analog to digital converter 24. The $R^4$ filter operates essentially as a frequency-dependent low-pass filter.

The processor 26 controls the operation of the radio components as well as the sampling/digitization of the mixed signal, and uses the samples that are obtained to determine any existing target objects on the basis of distance and relative speed.

Each measurement cycle can be implemented in program-controlled form with one or more antennas, with it being possible to carry out a plurality of successive measurement cycles from the same antennas or from different antennas.

Figure 2:
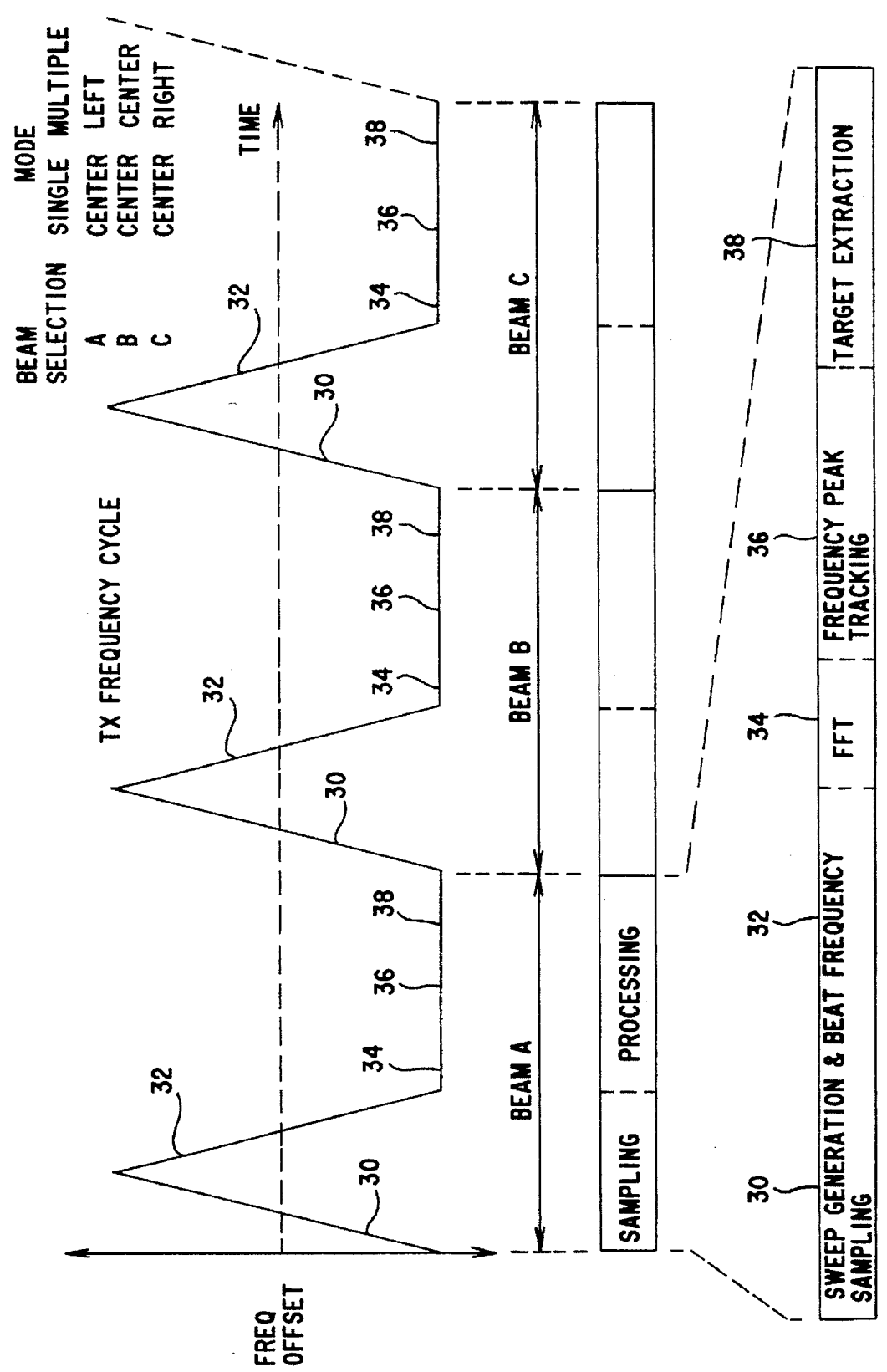
FIG. 2 is a diagram showing a typical response of one measurement cycle.

FIG. 2 illustrates three identical measurement cycles with an associated response of the modulation signal. Each cycle includes a first modulation phase 30 with a rising frequency, which is followed by a second modulation phase 32 with a falling frequency, that is followed by a pause 34, 36, 38.

In the first modulation phase 30, the processor 26 transmits those data which define the response of the modulation signal and at the same time reads and stores samples supplied from the analog to digital converter 24. The modulation time to pass through an entire modulation shift from the minimum frequency to the maximum frequency and vice versa is somewhat longer than the data detection time. Therefore, it is not possible to start data detection until after transient effects resulting from filtering of the mixed signal have decayed.

The modulation time and frequency shift in the first and second modulation phases are equal.

In the part 34 of the pause, the processor 26 controls two Fast Fourier transformations (FFT) being carried out for the samples recorded in the two preceding modulation phases (upward and downward) in order to determine object frequencies fu and fd and to assign them to one another. Since the object frequencies can only vary to a certain extent from one measurement phase to the next, assignment is simplified.

The distance and speed calculations are then used to identify the object frequencies in the two modulation phases belonging to the same target object and to combine them to form a frequency pair. As a result, incorrect assignment can be drastically reduced even if it is necessary to distinguish between a large number of target objects and even if the noise level is high.

Quantification of the correct assignment of object frequencies is obtained by calculating an error which is a function of the magnitude of the error between the distance and speed values which are obtained on one hand by addition and subtraction of the object frequencies in the two modulation phases and on the other hand as a result of evaluation of object tracks (discussed below). After calculation of the error, pairs of object frequencies for which the error is the lowest in each are selected in a simple search process. There is a very high probability that these pairs of object frequencies belong to the same target object, and the range and speed are finally calculated exactly from these frequencies in a known manner.

In the part or section 36 of the pause, the processor 26 then uses the object frequencies which have been found in each case to update one object track for the rising and falling modulation phases for each target object, which object track includes object frequencies determined in preceding measurement cycles, and to derive estimated values based thereon for the following measurement phase. During the next Fourier transformation, the next object frequencies are sought, preferably in the region of the determined estimated values, of the frequency range of the FFT split into cells (FFT cells).

Finally, in the part or section 38 of the pause, those object frequencies which belong to the same target object and form a frequency pair are determined on the basis of the response of the object tracks (estimated values from the preceding measurement phase and object frequencies assigned to them and determined in the subsequent measurement phase) in the two modulation phases.

The updating of the object tracks in each measurement cycle results in the frequency resolution and thus the measurement accuracy of the system being increased, which finally makes it possible to unambiguously calculate the distance and speed for each object frequency in the two modulation phases. The method also allows tracking of disappearing target objects by forming new estimated values from preceding, non-implemented estimated values, that is to say from estimated values to which no object frequency can be assigned in the next measurement cycle, the elimination of false alarms resulting from noise and the solution of problems which are caused by the reversal of the movement direction of a maximum in the spectrum (excessive error from estimated values).

An FFT is carried out, and the power spectrum calculated, for each modulation phase. On the basis of this, every object track which has been stored earlier is updated by carrying out a search in the power spectrum for a maximum within a range of FFT cells in the vicinity of a previously calculated object frequency. If a maximum which is above the noise is found there, this is used to update the specific object track. If no maximum is found, such a maximum is replaced by a calculated estimated value.

If the target object no longer appears even after a given number of measurement cycles, the object track is given up. After all of the already existing object tracks have been updated, the spectra are checked for object frequencies which have not yet been assigned and can possibly be assigned to newly discovered target objects. If any such target objects are found, then an object track having a previously calculated value is used for each object frequency. This object frequency is not treated as a confirmed target, and is released for the assignment process of object frequencies in the two modulation phases, until it has been found in a plurality of measurement cycles.

The calculation of the object frequency and its rate of change are then obtained for each confirmed object track from an optimum curve which is matched to this object track (mathematical optimization method, interpolation) at the points (object frequencies) which are present from earlier measurement cycles.

The object frequency for each target object contains two components fr and fv, which are dependent on the distance r and the relative speed v, per modulation direction (upward or downward). However, for a target object at a constant speed, the change in the object frequency is then only a function of the relative speed and thus makes it possible to calculate an estimated value fve for the speed-dependent component fv (if the duration of a measurement cycle is sufficiently short, each target object can be regarded as an object having a constant speed). This is done, for example, in such a way that the measured value fv from the preceding measurement cycle is determined as the estimated value fve and, for the measured value in the next measurement cycle to be valid, it may change with respect thereto only by a value which corresponds to a physically maximum possible change. If values result in this case which are physically impossible, these values are rejected. It is thus possible to obtain unambiguous values for fr and fv in all cases.

The capability of resolving ambiguities in the determination of the components fr and fv is one of the key features which makes it possible to identify target objects using a system having a low modulation rate. The estimation is now explained as follows: the method is based on calculating the values fr and fv after forming the previously determined estimated value fve, for each modulation phase in accordance with a variable fc which has been found for a respective object frequency fu or fd detected in the next measurement cycle.

If fc>fve, then fv=fve is set for both modulation phases. In contrast, the value of fr depends on the modulation direction, to be precise:

for upward modulation fr=fc+fve and
for downward modulation fr=fc−fve.

If fc<fve, then the calculation is more complex:

fv=|fve| during the upward modulation and is equal to minus the absolute value of fve in the downward modulation. The value of fr is likewise dependent on the modulation direction and, in addition, on the mathematical sign of fve:

If fve>0, then:
for upward modulation fr=|fve|+fc and
for downward modulation fr=|fve|−fc.

If fve<0, then:
for upward modulation fr=|fve|−fc and
for downward modulation fr=|fve|+fc.

The assignment of the object frequencies to the same target object in the two modulation phases is then based on the calculations of fr and fv. In principle, each pair of mutually assigned object frequencies fu and fd supplies two distance values and two speed values, namely the sum and the difference of the object frequencies in the two modulation phases. In the event of correct assignment of the two object frequencies, the sum can mean the distance and the difference can mean the relative speed or vice versa, depending on the relative magnitude of fr and fv. In contrast, both solutions are false in the event of incorrect assignment.

As in the case of the updating of the object tracks, earlier assignments of object frequencies to one another are maintained as long as their error value is small. It has been found that these error values rise very quickly in the event of incorrect assignment. In consequence, the process has a high safety level with regard to incorrect assignments and with regard to object tracks which are produced by noise. The latter in turn allows the limit for the system noise to be set very low, which is equivalent to a high detection sensitivity.

According to a simple development of the described process, it is also possible to identify target objects which are accelerating. In this case, the evaluation of the object tracks gives incorrect values, with the error being proportional to the acceleration vector. This results in an increased error value in the assignment of the object frequencies to a frequency pair if no compensation is carried out. According to the development, the accelerations are then calculated which are required to reduce the errors in the distance and speed which, on one hand, have been derived from the object tracks and, on the other hand, have been calculated from the object frequencies in the two modulation phases. A mean value on which a recalculation of the error value is based is calculated from the four acceleration values obtained in this way. If the assignment of object frequencies is correct, this calculation process converges and leads to a small error value, in contrast to a large error value in the event of incorrect assignment.

I claim:

1. A radar equipment, comprising:
    at least one antenna for transmitting and receiving radar signals;
    a signal processor for supplying said at least one antenna; and
    a mixer and a filter for producing a mixed signal;
    said signal processor receiving the mixed signal and further sensor signals, recording frequencies of maxima in a spectrum of the mixed signal separately on the basis of a rising and a falling modulation phase as object frequencies, and calculating a distance and a relative speed of a target object from the object frequencies;
    the object frequencies of the target object being stored separately over a number of measurement cycles on the basis of the rising and falling modulation phases;
    object tracks describing a previous time response of the object frequencies being formed from the stored object frequencies;
    estimated values for the object frequencies to be expected in a next measurement cycle being formed from a previous response of the object tracks;
    object frequency pairs in each case having the lowest error being assigned to one another, after calculation of an error from the object frequencies and from the estimated values obtained from the object tracks; and
    correct values for a range and a relative speed of the target object being calculated from the pairs.

2. The radar equipment according to claim 1, including:
    a circulator connected to said at least one antenna;
    a directional coupler connected to said circulator;
    a voltage-controlled oscillator connected to said directional coupler;
    a digital to analog converter connected between said signal processor and said voltage-controlled oscillator; and
    an analog to digital converter connected between said mixer and filter and said signal processor;
    said mixer mixing part of a transmitted signal with a received echo signals to form the mixed signal containing difference frequencies from which the distance and relative speed of at least one target object can be determined; and
    said signal processor being a digital signal processor for:
        controlling said oscillator through said digital to analog converter,
        receiving sensor signals and receiving samples of the mixed signal through said analog to digital converter,
        determining and recording the frequencies of the maxima in the spectrum of the mixed signal separately on the basis of a rising and falling modulation phase, and
        calculating the estimated values therefrom for the object frequencies in the next measurement cycle.

3. The radar equipment according to claim 2, wherein said filter is an analog filter connected downstream of said mixer for removing undesired radio-frequency/DC components from the mixed signal and optimizing the signal to noise ratio; and including another filter operating essentially as a frequency-dependent low pass filter and being contained in said analog filter.

4. The radar equipment according to claim 2, wherein said filter is an analog filter connected downstream of said mixer for removing undesired radio-frequency/DC components from the mixed signal and optimizing the signal to noise ratio; and including another filter operating essentially as a frequency-dependent low pass filter and being connected between said analog filter and said analog to digital converter.

5. The radar equipment according to claim 3, wherein said other filter is an $R^4$ filter.

6. The radar equipment according to claim 4, wherein said other filter is an $R^4$ filter.

7. A method for operating a radar equipment, which comprises:

transmitting and receiving with at least one antenna;

supplying the at least one antenna from a signal processor;

producing a mixed signal and feeding the mixed signal to the signal processor with a mixer and a filter;

separately subjecting digital samples of the mixed signals being detected and recorded in each modulation cycle during two modulation phases to Fast Fourier transformation in successive measurement cycles including a rising and a falling modulation phase in the digital signal processor and a subsequent evaluation pause for determining object frequencies from maxima contained in spectra;

separately forming object tracks describing a previous time response of the object frequencies having been stored over a number of measurement cycles for a target object, on the basis of rising and falling modulation phases from the object frequencies;

forming estimated values for the object frequencies to be expected in the next measurement cycle from a previous response of the object tracks;

assigning object frequency pairs having the lowest error in each case to one another, after calculation of an error from the object frequencies and from the estimated values obtained from the object tracks; and calculating correct values for a range and a relative speed of the target object from the pairs.

8. The method according to claim 7, which comprises setting a detection time for the samples of the mixed signals in each modulation phase to be shorter than a duration of the modulation phase.

9. The method according to claim 7, which comprises defining the error as a function of a magnitude of the error between the distance and relative speed values being obtained by addition and subtraction of the object frequencies in the two modulation phases of a measurement cycle and being obtained as a result of an evaluation of the object tracks.

10. The method according to claim 7, which comprises forming new estimated values from previous estimated values for tracking target objects having disappeared.

11. The method according to claim 7, which comprises applying a new object track having an estimated value after updating all already existing object tracks for each maximum having not yet been assigned in a measurement cycle.

12. The method according to claim 7, which comprises applying a new object track having an estimated value after updating all already existing object tracks for each maximum having not yet been assigned in a measurement cycle, if the new measured value is in the range of the estimated value.

13. The method according to claim 7, which comprises releasing each new object track for the assignment process of object frequencies of the two modulation phases only after a predetermined number of measurement cycles.

* * * * *